Sept. 18, 1962 W. WEBER ET AL 3,054,569
WINDING DEVICE FOR SPINNING, DOUBLING AND SPOOLING FRAMES
Filed Feb. 21, 1955 2 Sheets-Sheet 1

INVENTORS
Wolfgang Weber and Hans Lohest
BY
Karl Michaelis, Aty.

Sept. 18, 1962     W. WEBER ET AL     3,054,569
WINDING DEVICE FOR SPINNING, DOUBLING AND SPOOLING FRAMES
Filed Feb. 21, 1955     2 Sheets-Sheet 2

INVENTORS
Wolfgang Weber and Hans Lohest
BY
Karl Michaelis, Atty.

United States Patent Office 3,054,569
Patented Sept. 18, 1962

3,054,569
WINDING DEVICE FOR SPINNING, DOUBLING AND SPOOLING FRAMES
Wolfgang Weber and Hans Lohest, Remscheid-Lennep, Germany, assignors to Barmer Maschinenfabrik Aktiengesellschaft, Wuppertal-Oberbarmen, Germany, a joint-stock company of Germany
Filed Feb. 21, 1955, Ser. No. 489,692
Claims priority, application Germany Feb. 23, 1954
1 Claim. (Cl. 242—45)

This invention relates to winding devices for use in connection with spinning frames, doubling frames and spoolers, which will serve for winding threads, doubled yarns and the like at approximately constant speed and predetermined tension.

The winding devices so far used for this purpose involve very material disadvantages in that they require complex mechanisms governed by mechanical, hydraulic, electrical or electronic devices, for their regulation which render them too expensive for use with textile machines and far too sensitive to disturbing influences.

It is an object of the present invention to eliminate the drawbacks of existing winding devices, and to provide winding devices distinguished by such simplicity, economy and attenuated sensitivity as to render them particularly valuable for use in connection with spinning, doubling and spooling machines.

Other objects, and the manner in which the same are attained, will become apparent as this specification proceeds.

The present invention contemplates winding devices driven by a single phase or multiphase motor whose load-dependent speed, at a constant terminal voltage at the field winding, is regulated by varying the magnetic flux in the motor by means of an automatically operative adjusting device.

Variation of the magnetic flux may be effected by the adjusting device in various ways, such as, for example, by varying the relative positions of the field winding and the induction element of the motor, in which event the effective part of the field winding and the induction element are of equal length. In order to prevent, on variation of the relative positions of the field winding and the induction element, the lines of force of the field winding from tending to restore the former position, a magnetic conductor extending in the direction of the motor axis is disposed adjacent to and connected with the induction element, which in accordance with such variation, either fills or vacates the space between the field winding and the induction element.

Another mode of regulating the load-responsive speed of the motor involves the use of magnetic short-circuiting devices arranged between the field winding and the induction element, for displacement in the direction of the motor axis, the displacement of these devices being controlled by the adjusting device.

The adjusting device may comprise a feeler which scans the thread, yarn or the like, preferably in a loop formed thereby, and which is responsive to variations of the predetermined tension thereof, or the adjusting device may comprise a feeler which scans the circumference of the cop and is governed by a change in its diameter. The adjusting-device may also be responsive to the length of time the winding takes.

In order to transmit the motions of the adjusting device to the motor part to be displaced, a drum-type cam member connected with the adjusting device and arranged for rotary displacement, and associated elements are disposed centrally with respect to the motor, said elements shifting the motor part to be displaced in the direction of the motor axis, to vary the flux. In order to prevent the adjusting device from being subject to unintentional influences on the part of the motor, the cam part of the drum is so designed that between this part and the member to be operated thereby, the engagement is self-locking with respect to the latter.

When conical cops are wound, the differences in diameter of the cop with every back and forth movement of the thread guide cause the feeler scanning the thread being wound, with its lever supported centrally to the motor, to execute rocking movements designed to adapt the speed of the motor to the variations in the diameter of the cop prevailing at the point where the thread runs on the cop. With modern high-speed winding methods, however, the speed of the motor cannot adapt itself as quickly as desired, to the varying increases of the cop diameter at that point. For this reason, provision is made for a certain play between the cam part of the drum and the member engaging it, which play must be adapted to the prevailing differences of the cop diameters, and which leaves to the feeler scanning the thread a corresponding freedom of movement, which does not influence the longitudinal position of the motor part influencing the magnetic flux. In order to prevent any unintentional displacement of the motor part which influences the magnetic flux, a brake is arranged to act on a member connecting the drum type cam with the motor part connected therewith.

Another method of preventing, in the winding of conical cops, the rocking motion of the feeler scanning the thread or the like, with its lever supported centrally to the motor, from influencing the motor part to be adjusted, in spite of the variations of the cop diameter, encountered in the back and forth movement of the thread from one end of the cop to the other, involves the arrangement on the drum type cam, of two adjustable stops which allow only part of the rocking motion of the lever to be transmitted to the cam. In order to impede unintentional movements of the drum type cam, a braking member acting on the cam is provied, and/or the lever is supported independently from the drum type cam.

In order to safeguard the longitudinal position, established by the adjusting device, of the part of the motor influencing the flux, the magnetic conductor on the induction element, as far as its magnetic characteristics are concerned, is designed so that the relative axial positions of the field winding and the induction element, remain uninfluenced by the flux.

It is also possible to provide for a magnetic behavior of the magnetic conductor on the induction element of the motor, such that the field winding and the induction element of the motor are caused by the flux of the field winding to change their relative axial positions, whereby the adjusting forces of the adjusting device can be better adapted to prevailing requirements.

In order to attain the maximum efficiency of the motor, the input voltage at the fielding winding, can be preadjusted corresponding to the torque required.

When winding cops on comparatively large tubes, it is in the interest of optimum utilisation of the space available to mount the motor to be controlled according to the invention, inside the tube.

In the drawings annexed to this specification and forming part thereof, several embodiments of this invention are illustrated diagrammatically by way of example.

In the drawings:
FIGS. 1 and 2 are different schematic views of one embodiment of winding devices according to this invention.
FIGS. 3 and 4 are sectional views of motors (with certain parts shown in different stages of displacement), for use in connection with the winding device shown in FIGS. 1 and 2.

FIGS. 5–7 show details of the motor of FIGS. 3 and 4, FIG. 5 being a side elevation of FIG. 4 viewed in the direction of the arrow A, while FIG. 6 is a sectional view of FIG. 4 viewed in the direction of the arrows B and C, and FIG. 7 is a partial side elevation of FIG. 4 viewed in the direction of the arrow D, the part 36 of the drum being omitted.

Figure 1:
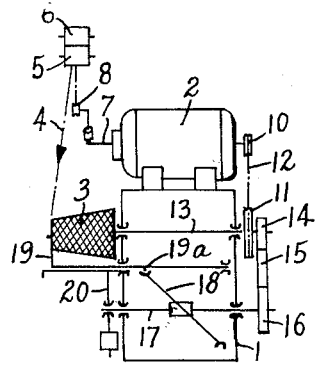
Figure 2:
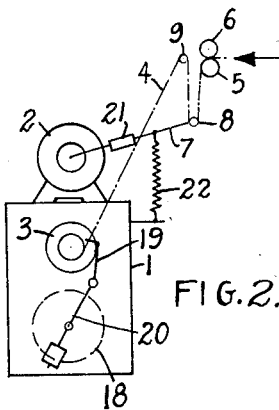

The winding device shown in FIGS. 1 and 2 in two different views, comprise a gear box 1 for the support of the cop and for the yarn distributing mechanism. 2 is an adjustable motor, 3 is the cop, 4 the thread or yarn to be wound up, which as shown, passes in the direction of the arrow from a delivery drum through the driven rolls 5 and 6 and over the dancer roll 8 and guiding rod 9, at a uniform speed, to the cop 3. The motor 3 drives, by means of the chain drive 10, 11, 12, the shaft 13 carrying the cop 3.

The shaft 13, in turn, drives, via spur gears 14, 15, 16, the shaft 17 which mounts a disk 18 which is inclined with respect to the shaft 17 and includes a notch opening in a direction away from the shaft. The notch in the disk 18 is engaged by the pin 19a of the thread guide 19; with every revolution of the shaft 17 and the disk 18, this pin 19a executes a full back and forth movement in axial direction whereby the thread 4 is distributed over the entire width of the cop 3.

The thread guide 19, its pin 19a as well as the connecting rod connecting these two elements, are supported on the rocking lever 20, which is displaced, as the diameter of the cop increases, clockwise about an axis coinciding with the shaft 17.

The adjusting member 7, 8, which scans the thread 4 in a loop, regulates the speed of the motor 2 in dependency on the predetermined tension of the thread 4, by influencing the magnetic flux in the motor. The degree of tension acting on the thread 4 is determined by a weight 21 arranged for displacement on the adjusting device 7, 8 or, as shown in dash lines in FIG. 2, by an adjustable spring 22. A disposition, different from the one shown in the drawing, of the weight 21 or the spring 22 relative to the adjusting device 7, 8, permits also the adjustment of a varying tension of the thread during the winding operation.

Figure 3:
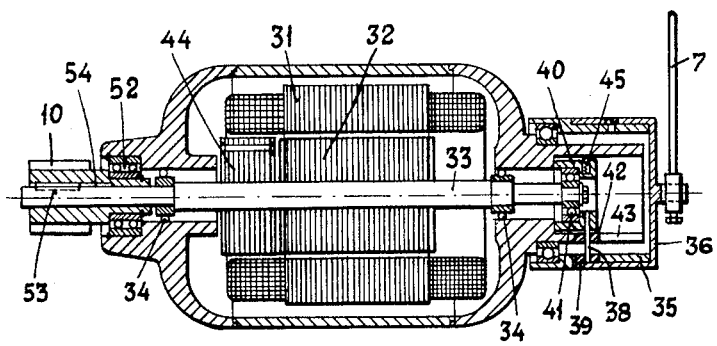
Figure 4:
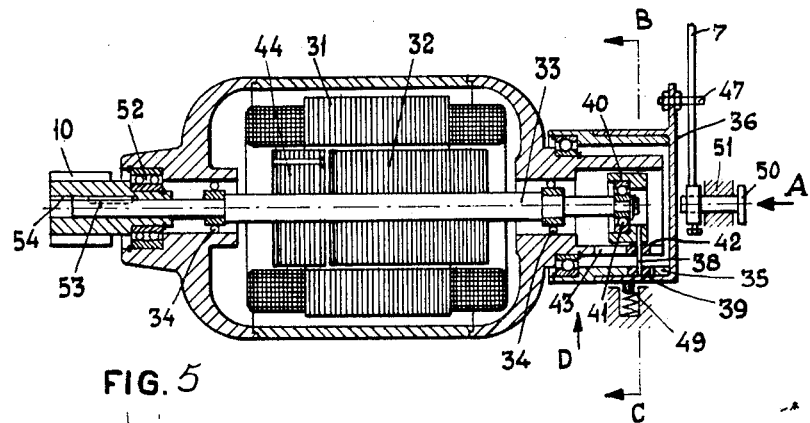

The motors shown in FIGS. 3 and 4 have in common that they permit the relative displacement of the field winding 31 and the body of magnetic material forming the induction element 32 in the direction of the motor axis. If the relative positions of the field winding 31 and the induction element 32 are changed in the direction of the motor axis, the magnetic flux is influenced and the speed of the motor is changed. If the induction element 32, as shown in FIG. 6, is shifted toward the right, the speed of the motor drops, and when the induction element 32 is shifted into the position shown in FIG. 5, it rises again. The induction element 32 is supported by its shaft 33, in ball bearings 34 which admit of rotary movements and within certain limits also of longitudinal movements of the induction element 32. In response to changes in the tension acting on the thread or in the diameter of the cop, the adjusting device 7 according to FIGS. 1 and 2 imparts to the parts 35 and 36 of the drum, with certain limits, a rotary motion, which by the cam notch 37 in the drum portion 35 (FIGS. 6 and 7), is translated into an axial movement of the sleeve 40, which via antifriction bearing 41 is connected with the shaft 33 of the induction element, or armature, 32. The transmission is effected by means of a pin 38 rigidly mounted in the sleeve 40, which pin carries two rollers 39 and 42, the roller 42 being supported in the stationary groove 43 of the motor casing to impede rotation of the pin 38 and the sleeve 40 in the direction of rotation of the motor, whereas the roller 39 rolls off in the cam notch 38 of the drum portion 35 on rotation thereof, so as to initiate the translation of the rotary motions of members 7 or 25 into a stroke-like movement of the pin 38 and sleeve 40.

A magnetic conductor member forming a shunt 44 is arranged adjacent to the induction element 32 and connected therewith by way of the shaft 33, and is designed, on displacement of the induction element 32, to enter or vacate parts of the hollow space inside the field winding. The magnetic conductor or shunt may be so arranged, as regards its magnetic properties, that the lines of force emitted by the field winding 31 either do not influence the induction element 32 with respect to its longitudinal position, or influence it in such manner that this element tends to change its position in one or the other sense, so that the adjusting forces of the adjusting device can be better adapted to prevailing requirements. In order to prevent the rotor from imparting unwanted displacements to the feeler 7 or the lever 25, the form of the cam slot 37 is so chosen, that a self-locking effect is obtained between the cam slot 37, and pin 38 and roller 39, as far as the latter are concerned.

When producing conical cops, the cam slot 37 offers sufficient room for the roller 39 engaging it, that the feeler 7, during its rocking movements caused by the varying diameters of the cop, when the thread travels from the thick end of the cop to the thin and back to the thick end, enjoys a certain play which does not influence the position of the induction element 32. It is useful to arrange at the part 40 a braking member 45, which is acted upon by a spring and impedes unintended longitudinal movements of the induction element 32 (FIG. 3).

Figure 5:
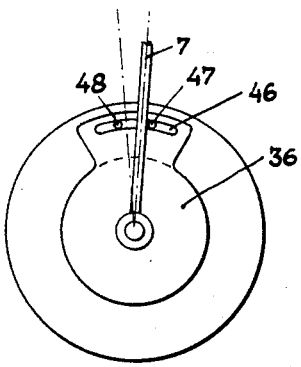
Figures 6, 7:
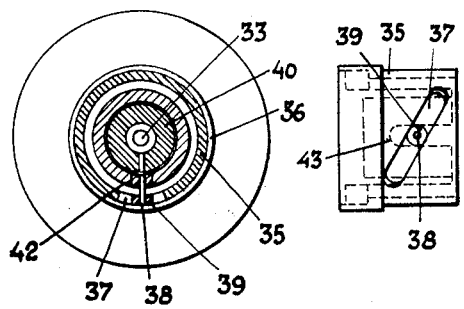

The driving lugs or stops 47 and 48 which are adjustably disposed, according to FIGS. 4 and 5, at the part 36 of the drum and in the slot 46, also allow the feeler lever 7 a certain freedom of movement, which is adapted to the variations in the thread running-in owing to the variations of the diameter at the thick and the thin ends of the cop 3. These movements of the feeler lever 7 within the predetermined limits between the stops 47 and 48 also do not influence the position of the induction element 32. A spring-influenced brake 49 acting on the part 36 of the drum, impedes any unintended variation of the position of the induction element 32.

In order to avoid a transmission of the rocking movements of the feeler lever 7 between the stops 47 and 48 to the parts 35 and 36 of the drum, the feeler lever is supported, independently from the drum part 36, but centrally with respect to it, in the bearing 51 by means of the bolt 50.

The gear 10 mounted to permit end play of the shaft 33 and driving the cop is supported in the ball bearing 52 for rotary movement, while being prevented from moving axially. It is rotated by means of the key 53 in the shaft 33 and the groove 54 in the gear 10.

Figure 8:
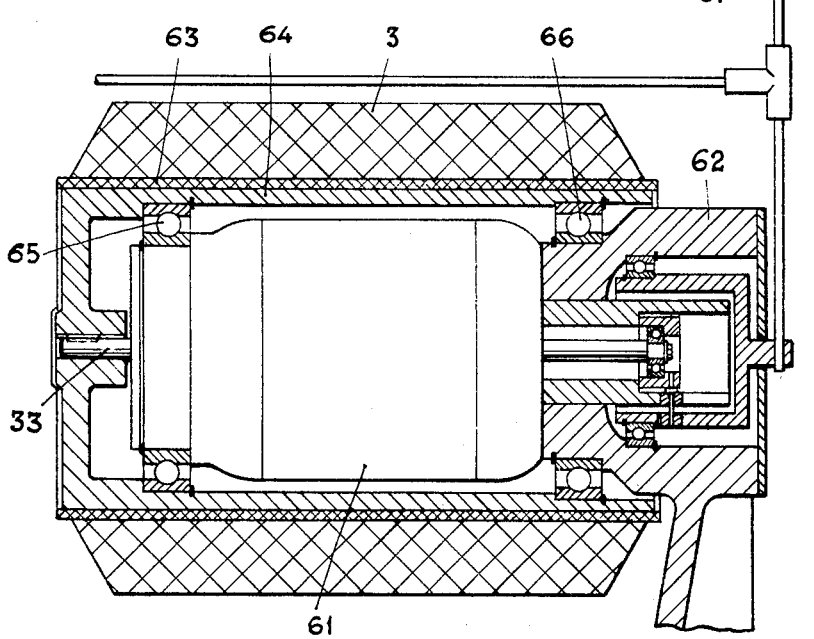
FIG. 8 illustrates a particular way of mounting the motor.

FIG. 8 shows a further embodiment of the invention wherein a controllable motor 61, similar to that shown in FIG. 3, is accommodated inside the cop. The motor 61 is mounted on a support 62. The shaft 33 protruding from the motor drives the cylinder 64 supporting the tube 63 carrying the cop 3, the cylinder being supported by means of the ball bearings 65, 66 on the motor 61 and the support 62. The adjusting device comprises a feeler lever 67 which scans a loop of the thread (not shown). This lever is adjustably influenced by a weight 68 or a spring (not shown). This adjusting device controls the position of the induction element 32 and thus the speed of the motor as shown in and described with reference to FIG. 3. This mount of a controllable motor according to the invention, is particularly advantageous for use in connection with comparatively large cops of the type used in the manufacture of thermoplastic threads.

Other types of motors, of course, may be used for purposes of the invention, in addition to those exemplified in the present specification and the accompanying drawing. Thus, for example, the field winding may be the rotary, and the induction element the stationary part of the motor. Or the field winding may be arranged to be displaced relative to the induction element in the direction of the motor axis for speed varying purposes.

If a device according to this invention is installed in a spinning and doubling frame, it is also possible to drive the spinning and doubling components together or in groups, while operating the winding drive individually and utilizing therefor the adjustment devices and procedure of the invention.

With winding frames as well as with spinning and doubling frames, it may also be advantageous to drive the thread guides together or in groups, while driving only the winding devices individually for adjustability according to the present invention.

We wish it to be understood that we do not wish to be limited to the details above described and shown in the drawings, for obvious modifications within the scope of the claim will occur to a person skilled in the art.

We claim:

In a fragile, gossamer filament winding device for spinning, twisting and spooling machines comprising an induction motor having a frame, a shaft journalled on the frame for turning a filament receiver, a rotor including a body of magnetic material forming an induction element drivingly connected with the shaft and a stator coaxially encircling the rotor, the combination, with said stator and said element, of continuously operating means for varying the speed of the motor substantially instantly in response to changes in fragile filament tension, said means including a magnetic conductor forming a shunt mounted on the shaft adjacent the body of magnetic material and shiftable in the axial direction of the shaft with respect to the stator to vary the operating speed of the motor, and automatic adjusting means responsive to variations in the differential between the rate of delivery of filamentary material from a supply source and the rate at which the material is applied upon the receiver for controlling axial movement of the magnetic shunt, said adjusting means comprising a rotary drum turnable on the frame, an inclined cam slot formed in the drum, and pin mounted roller means drivingly connected with said shunt and engaging in said cam slot and guided for movement on the frame in the axial direction of the shaft, whereby to translate rotary movements of the drum to corresponding displacements of the shunt in the axial direction of said shaft, said drum having a pair of adjustable driving lugs, and a drum driving member movable in opposite directions, in response to said variations, to drivingly engage said lugs, said member being movable between said lugs without turning the drum.

References Cited in the file of this patent

UNITED STATES PATENTS

| | | |
|---|---|---|
| 672,745 | Stonemetz | Apr. 23, 1901 |
| 1,432,640 | Szalai | Oct. 17, 1922 |
| 2,116,739 | Eason | May 10, 1938 |
| 2,462,766 | Olson | Feb. 22, 1949 |
| 2,603,427 | Holmes | July 15, 1952 |
| 2,720,093 | Lambach | Oct. 11, 1955 |
| 2,748,334 | Muller | May 29, 1956 |

FOREIGN PATENTS

| | | |
|---|---|---|
| 892 | Great Britain | Jan. 4, 1908 |
| 718,860 | France | Nov. 13, 1931 |
| 691,864 | Germany | June 7, 1940 |
| 470,233 | Italy | Mar. 28, 1952 |